Feb. 1, 1966    S. G. KLEINBORTAS    3,232,502
COLLAPSIBLE LUGGAGE RACK
Filed May 25, 1964    3 Sheets-Sheet 3
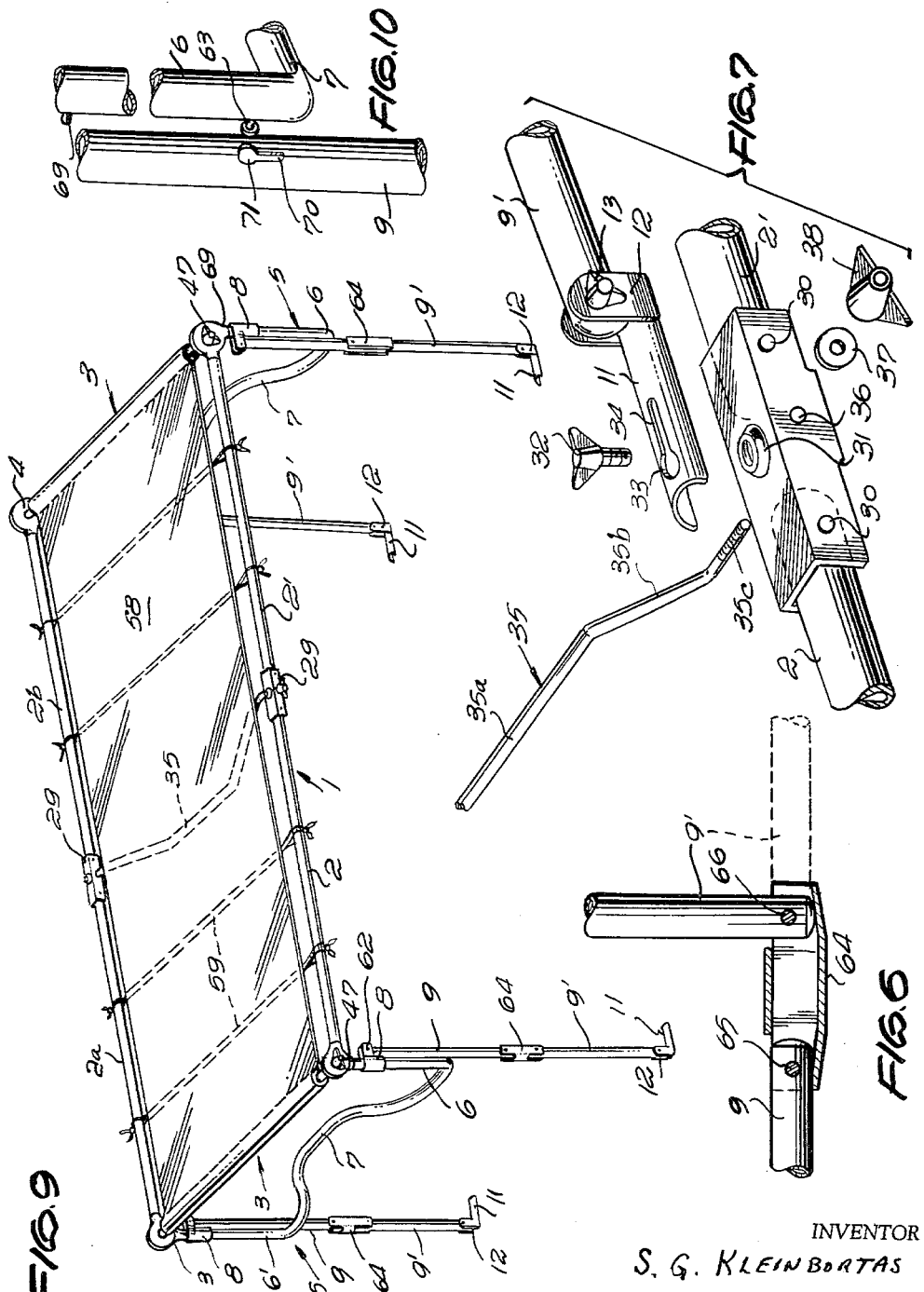
INVENTOR
S. G. KLEINBORTAS
BY Joseph Osheroff
ATTORNEYS

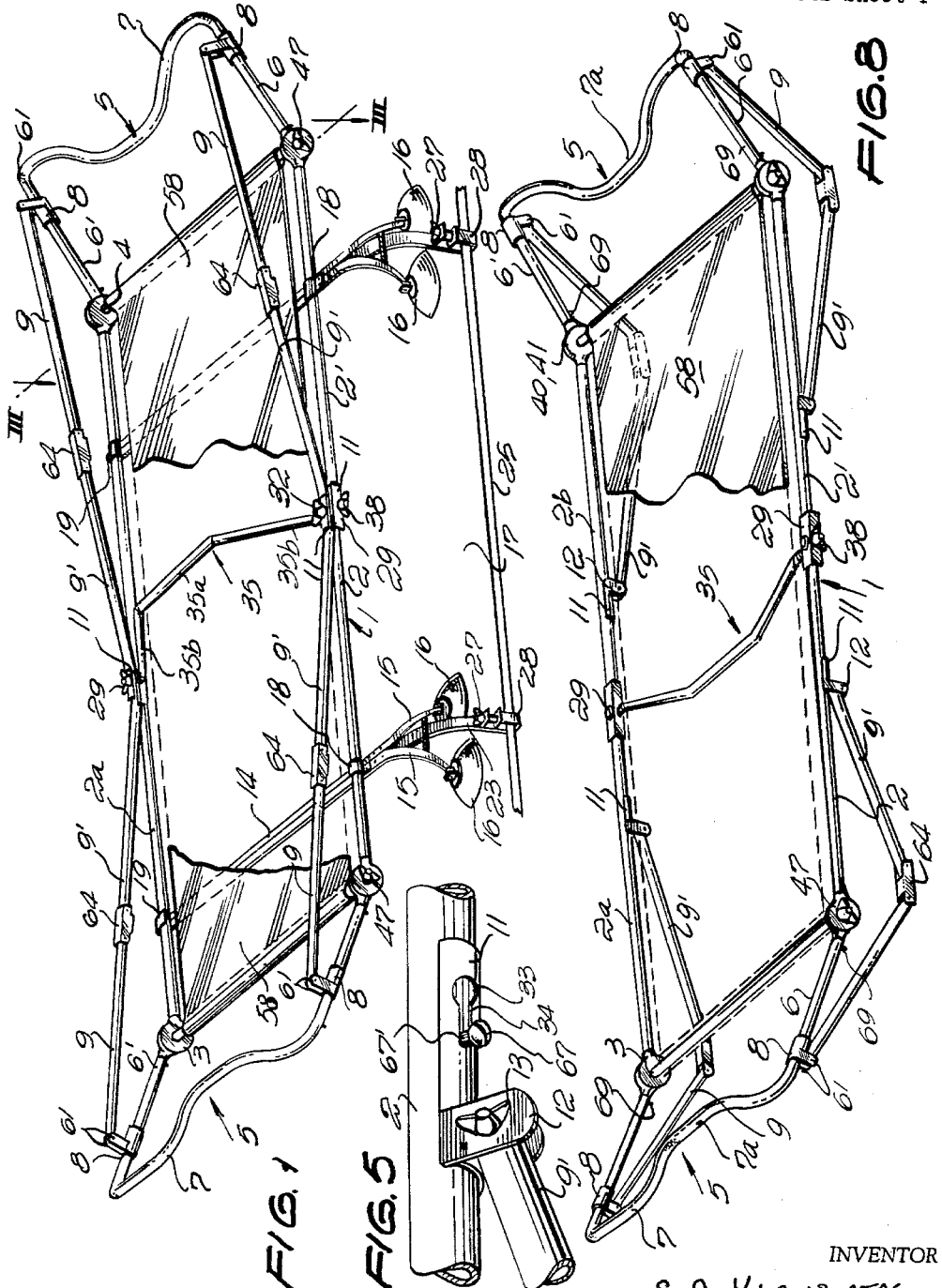

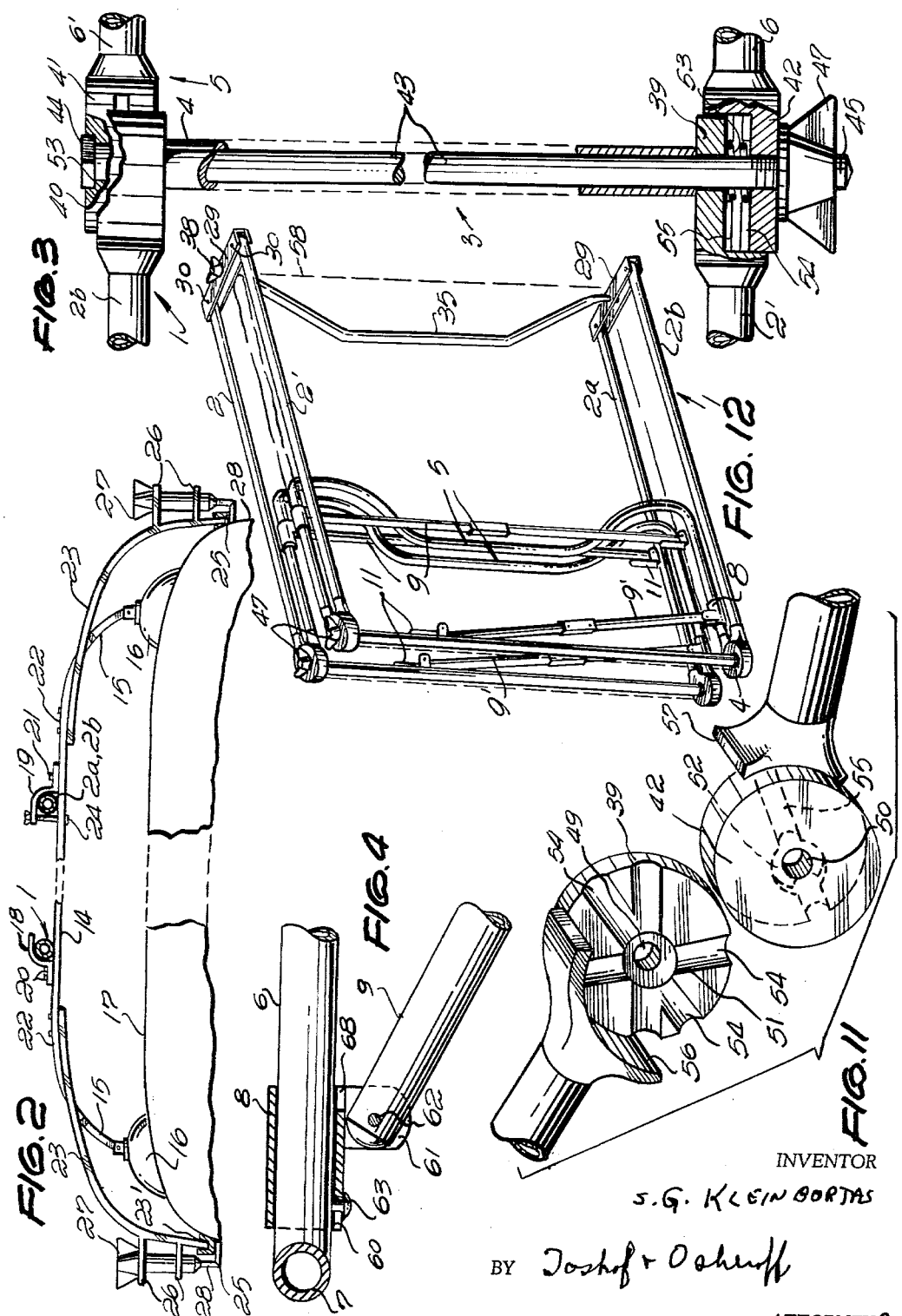

United States Patent Office 3,232,502
Patented Feb. 1, 1966

3,232,502
COLLAPSIBLE LUGGAGE RACK
Samuel G. Kleinbortas, 1394 Warnes St.,
Buenos Aires, Argentina
Filed May 25, 1964, Ser. No. 369,748
12 Claims. (Cl. 224—42.01)

This invention refers to a collapsible luggage rack for motor cars and the like, transformable into a table as well as a field bed and according to a simpler embodiment, the invention likewise relates to a collapsible table transformable into a field bed.

Since picnics and camping are becoming more and more popular, the use of luggage racks for motor cars is required in many circumstances.

However, picnics and camping are not performed throughout the entire year, so that the luggage rack should be removable and collapsible to become storable, without requiring much space. If such a luggage rack can at the same time be transformed into a table as well as a field bed, the invention is bound to become quite useful.

The collapsible luggage rack according to the present invention comprises mainly a substantially rectangular main frame member which is preferably of the collapsible type and which has pivotally linked to its ends a pair of U-shaped end members which may be locked in different positions, such that each defines a sloped plane with regard to the plane defined by the main frame member when acting as a luggage rack or as a field bed or defining each a plane at substantially 90° with respect to said main frame when acting as a table or finally being arranged parallelly to said main plane when in collapsed position.

The U-shaped end members each have a pair of branches on each of which a bushing is slidably and rotatably mounted, and each bushing pivotally supporting a collapsible leg member which may be linked either to the branches when forming a table or to the main frame member when forming a luggage rack or a bed.

If the leg members are used for a luggage rack, they act as side guards while if the invention is used as a bed, these leg members are arranged in a different position so as to define proper legs for the field bed.

In order to facilitate the comprehension of the present invention, reference will now be made to a specific embodiment, by way of example, in relationship to the accompanying drawings, wherein:

FIG. 1 is a perspective view of a collapsible luggage rack for motor cars and the like, shown in the position corresponding to such a luggage rack.

FIG. 2 is a front view of the supporting arrangement mounted on the roof of a motor car, for supporting the main frame member of the luggage rack, and only the pair of side members of said main frame member is shown, in cross-section.

FIG. 3 is a detail in top plan view, partially in cross section, according to line III—III of FIG. 1.

FIG. 4 is a detail in side elevation, showing the bushing in cross section and a portion of the leg member.

FIG. 5 is a detail in perspective view, showing the end portion of the leg member with its foot member linked to the side member of the main frame member, when the device is in the position corresponding to a field bed.

FIG. 6 is a side elevation, partially in section, showing the middle portion of a leg member and the way in which the latter is pivoted.

FIG. 7 is an exploded perspective view of the central portion of one side member of the main frame member and the middle cross bar, as well as the end portion of one leg member with their respective accessories.

FIG. 8 is a perspective view of the invention in the position of a field bed.

FIG. 9 is a perspective view of the invention in the position of a table.

FIG. 10 is an exploded perspective view of a portion of one U-shaped end member and a portion of the leg member, to show the way in which the two are to be fitted together.

FIG. 11 is an exploded perspective view showing a detail of the hinge member.

FIG. 12 shows the device in collapsed position, the canvas being shown in dotted lines.

As may be seen in the drawings and particularly with reference to FIG. 1, the collapsible luggage rack for motor cars and the like comprises a substantially rectangular main frame member 1 defined by a pair of side members, each consisting in this embodiment of two half side members 2, 2' and 2a, 2b and a pair of cross members 3, 4. The main frame member 1 further pivotally supports by the pairs of corners—to which reference will be made in more detail when referring to FIGS. 3 and 11—two substantially U-shaped end members 5, each being defined by a pair of branches 6, 6' linked together by a base member 7. A bushing 8 is slidably and rotatably mounted on each of said branches 6, 6'. Each bushing pivotally supports one end of a leg member defined in this embodiment by two half leg members and more particularly the upper half leg member 9 and the lower half leg member 9'. Each lower half leg member 9' has a free end portion onto which a concavely shaped foot portion 11 is pivotally mounted by means of a bracket 12 (see FIG. 7) and a wing screw and nut arrangement 13. The wing screw and nut arrangement 13 is shown in detail only in FIGS. 5 and 7.

Without having yet described the details of the device, it may however be admitted, for facilitating the further explanation, that when said device is in the position corresponding to the luggage rack, as shown in FIG. 1, that the additional accessories which are required therefor consist of a pair of cross bars 14 each ending at each side in a pair of fingers 15, each of which pivotally supports a pair of rubber pads 16 which are to be placed on the roof 17 (see also FIG. 2) of a motor car or the like. Since each cross bar 14 rests on two pairs of rubber pads 16, provided the cross bar 14 is anchored on the roof 17, it will remain thereon even if there is no collapsible luggage rack linked thereto as will be later better understood.

On the top of each cross bar 14 and adjacent the fingers 15, clamp members 18 and 19 are mounted. More particularly, clamp member 18 is stationarily mounted on cross bar 14 by means of a pair of bolts 20 while clamp member 19 is rotatably mounted by means of a single bolt 21. Thus, it can already be understood that if each clamp member 19, with regard to the position shown in FIG. 2, is rotated bout its bolt 21, it is possible to mount and dismount the half side members 2, 2', 2a, 2b (FIG. 1) with regard to each cross bar 14. By rotating each clamp member 19 in such a way that the free end portion thereof overlaps the respective half side member 2a and 2b, the frame 1 is clamped onto cross bars 14. Thereafter, the blocking bolt 24 may be passed through cross bar 14 and the pertinent clamp member 19, to block each of said half side members 2a and 2b and at the same time the pertinent clamp member 19. Thus, the main frame member 1 may be mounted and dismounted from the two cross bars 14.

Each of the cross bars 14 is furthermore anchored to the roof 17 by means of a pair of strip members 23. One end portion of each strip member 23 is linked by means of bolts 22 to the cross bars 14. Cross bar 14 has a number of perforations so that bolts 22 and strip member 23 may be arranged in different positions to adjust the anchoring means in accordance with the width of the roof 17.

Each strip member 23 (see FIG. 2) enters with its free end portion 23' into the side channel member 25 from the top and furthermore brackets 26 which are integral with strip member 23 support a wing nut arrangement 27 having a height adjustable anchoring L-shaped member 28 which fits underneath the side channel member 25, so that each cross bar 14 becomes perfectly anchored onto roof 17. This particular arrangement of the free end portions 23', side channel members 25, wing nut arrangements 27, and height adjustable anchoring L-shaped members 28 has the advantage that the anchoring force which is exerted onto the side channel members 25 is compensated, because each free end portion 23' of strip member 23 exerts a downward pressure and the pertinent L-shaped anchoring member 28 an upward pressure, to distinguish over the known arrangements, which only have an equivalent of the L-shaped members 28 and therefore produce an upward pressure tending to tear off the side channel members from roof of the motor-car.

Returning now to the main frame member 1, each set of side members 2, 2' and 2a, 2b are pivotally linked together by a middle bracket member 29 (see particularly FIG. 7), which is a U-shaped channel member having pivots 30 and 30', to which said half side members 2, 2' and 2a, 2b are pivoted. On the top portion of the middle bracket member 29 there is a nut projection 31 to which a pair of superposed concavely shaped foot portions 11 (only one shown in FIG. 7, but the two are shown in FIG. 1) may be linked, by means of a wing screw 32. For this purpose, each foot portion 11 has a bore 33 ending into a slot 34, so that wing screw 32 may enter bore 33 and be screwed into the nut projection 31. The pair of middle bracket members 29 is furthermore linked together to give more rigidity to the device, by a middle cross bar 35 which has a middle base portion 35a, a pair of sloped portions 35b and a pair of screw threaded fitting portions 35c (only one visible in FIG. 7), substantially parallel to middle base portion 35a.

Sloped portions 35b give a suitable rigidity to the assembly when in unfolded position. Each screw threaded fitting portion 35c is passed through a pair of central bores 36 in the middle bracket member 29 (only one visible in FIG. 7), so that a washer 37 and wing nut 38 may be screwed thereon. By already comparing FIGS. 1 and 8, it will be seen that middle cross bar 35 may be arranged in different positions according to the circumstances.

The structure which links the U-shaped end members 5 to the main frame member 1 is best shown in FIG. 3. Since the structures on both ends are identical, reference will only be made to FIG. 3. Each of the half side members, in FIG. 3, 2' and 2b support half a hinge member 39, 40, respectively and each of the pertinent branches 6' support the complementary half hinge member 41, 42. Each of the half hinge members 39 to 42 are provided with a central bore through which passes a tie rod 43 one end of which is integral with a square head 44 housed in a pertinent recess in the half hinge member 41, while the other end is screw threaded, as identified by reference numeral 45. A washer 46 and a wing nut 47 are mounted from the outside on the screw threaded end 45. A tubular spacer 48 is mounted on tie rod 43 in between opposite inner half hinge members. As better shown in FIG. 11, each pair of half hinge members, for instance 39 and 42, have besides the respective central bores 49, 50, and inner central recess 51, 52. Between said recesses, and surrounding tie rod 43, as shown in FIG. 3, a spring 53 is mounted which tends to space apart the half hinge members 42 and 39 upon loosening wing nut 47. The half hinge member 39 is provided on its inner face with a star arranged slot series 54 into each diametral pair of which, a diametral nose projection 55 will enter the half hinge member 42. In FIG. 3, star arranged slot series 54 and diametral nose projection 55 are not in engagement, because the loosened position is shown. Each of the half hinge members 39 and 42 have a side ear 56, 57 for limiting the rotational movement of half hinge member 42 with regard to half hinge member 39. Thus, upon loosening wing nut 47 it is easy to swing U-shaped end member 5 around tie rod 43 with regard to the main frame member 1 and to adjust it to different positions, as shown in FIGS. 1, or 8, 9 and 12. In each of the positions, diametral nose projection 55 will enter the pertinent pair of slots 54.

A canvas 58 is arranged between opposite tubular spacers 48 which form part of each cross member 3, 4. The canvas 58 is actually provided with a number of cross strips 59 which are only shown in FIG. 9, to avoid overburdening the other figures, and which are sewn or otherwise linked to the underside of the canvas 58 and are further tied by their free ends to the side bars 2, 2', 2a, 2b, as shown in FIG. 9 whereby, if the device is used in any of the positions as shown in FIGS. 1, 8 and 9, it is assured that the canvas 58 is reasonably tight.

The bushings 8 each have at their respective rear portions a slot 60 (see FIG. 4) and a pair of ears 61 (see also for instance FIGS. 1 and 8) supporting a pivot 62 (FIG. 4) to which the upper half leg member 9 is pivoted. Since, as previously stated, bushing 8 is rotatably and slidably arranged along branches 6, each pair of half leg members 9, 9' may be swung around branches 6 so that for instance the positions as shown in FIGS. 1, 8 or 9 may be adopted. When the arrangement of the bushing 8 and the pair of half leg members 9, 9' is to be positioned to operate as a supporting leg for the bed, as shown in FIG. 8, then the bushing 8 is slid towards the base member 7 until the slot 60 (FIG. 4) enters the knob 63, whereby bushing 8 is blocked.

Thereafter, the linking member 64 (see particularly FIGS. 6 and 8) which pivotally links by means of pivots 65, 66 up half leg member 9 with lower half leg member 9', allows to bend leg members 9 and 9' to adopt the position as shown in FIG. 8 and the concavely shaped foot portion 11 (see FIG. 5) is then fitted by its concave side onto side member 2 passing first bore 33 through knob 67 and then sliding foot portion 11 along the stem 67' until the end of slot 34 is reached, whereby the leg member is suitably blocked. At the same time, the U-shaped end members 5 are arranged in the sloped positions, as shown in FIG. 8 and the previously loosened cross member arrangements 3, 4 are adjusted by means of wing nuts 47.

As may be seen in this position, the canvas 58 together with the main frame 1 operates as a bed which is separated from the floor by the leg arrangements, wherein linking members 64 rest on the floor as well as middle base portion 35a of middle cross bar 35. The base member 7 has a V-shaped middle portion 7a, to reduce the distance between the cross members 3, 4 and the base member 7, so that there is no tendency of a pillow to slip through the opening defined by the U-shaped end member 5.

If the device is to be used as a luggage rack, then each foot portion 11 is dislinked from its knob 67, lower half leg member 9' and upper half leg member 9 are rotated with regard to linking member 64 to define a straight member, bushing 8 is withdrawn from its knob 63 and the straight leg 9, 9' is now turned round branches 6 through 180° and moved toward the cross member 3 and 4, respectively, until bore 33 of foot portion 11 may be located above nut projection 31, to fix it thereto by means of the wing screw 32. In this position of the luggage rack, the ears 56 and 57 (FIG. 11) are in abutting contact, so that thereby the maximum sloped position of U-shaped end member 5 is defined and there is no need to block bushings 8.

If the device according to the present invention is to be transformed into a table, as shown in FIG. 9, then the two U-shaped end members 5 are turned through 90° by previously loosening wing nuts 47 which thereafter are retightened. Each bushing 8 is slid towards the pertinent cross member 3, 4 so that a further slot 68 (FIG. 4) opposite slot 60 may move over, stop pin 69 (FIGS. 8 and 10) to again immobilize bushing 8 with regard to its branch 6. The half legs 9 and 9' are each in straight position, and with regard to the position of FIG. 1, have been swung about pivot 62 (FIG. 4). In addition, each upper half leg member 9 has a slot 70 ending into a bore 71 (FIG. 10) which is used to locate therein knob 63 mounted on branches 6 by first inserting the knob through bore 71 and then sliding the half leg member 9 upwardly, until the stem of said knob 63 enters the end portion of slot 70. Thus, it will already be appreciated that the knobs 63 are used for two different purposes, namely when the arrangement operates as a bed, as shown in FIG. 8, and as a table, as shown in FIG. 9.

Furthermore the concavely shaped foot portions 11 are of course in this instant turned around by loosening wing nut 30 (FIG. 7), so as to define a true foot for table, which is particularly useful if the table is used on the earth to avoid that it sinks into the earth.

Finally, as to the collapsed position shown in FIG. 12, it is considered unnecessary to enter into further details in view of the previous explanations.

It is to be pointed out that an outstanding feature of the invention resides in that the combination of means allows to perform all the structures without having to add or dismount additional elements.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, said leg members further including means for additionally linking said leg members to the hereinbefore defined structure.

2. The luggage rack as claimed in claim 1, wherein each cross member comprises a tie rod, a tubular spacer mounted on said tie rod between said side members, pairs of half hinge members, said side members being linked to said U-shaped end members by two pairs of said half hinge members linked together by said tie rod and blockable in different positions thereby.

3. The luggage rack as claimed in claim 2, wherein a spring is arranged between each pair of half hinge members and coiled on said tie rod, said tie rod having two ends, a square head defining one end of said tie rod and housed in one of said half hinge members, the other end of said tie rod being screw threaded and passing through the other of said pairs of half hinge members, a wing nut mounted on the screw threaded end of said tie rod adapted to block said two pairs of half hinge members.

4. A collapsible luggage rack for motor cars and the like, transformable into a table as well as a field bed, comprising a structure including a substantially rectangular main frame member defined by a pair of side members and a pair of cross members, each of said side members consisting of two half side members, two middle bracket members each pivotally supporting a pair of said half side members, thereby allowing to fold said main frame member, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, said leg members further including means for additionally linking said leg members to the hereinbefore defined structure.

5. The collapsible luggage rack as claimed in claim 4, wherein said two middle bracket members are U-shaped channel members each having a top portion, a middle cross bar linking said two middle bracket members, a nut projection mounted on each of the top portions, said collapsible leg members are linkable to said nut projection.

6. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, said leg members each having a free end portion, a concavely shaped foot portion pivotally linked to each of said free end portions, said concavely shaped foot portions are furthermore linkable to said pair of side members.

7. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member spaced apart stops mounted on each of said branches, a bushing slidably and rotatably mounted on each of said branches, a pair of opposite slots in said bushings adapted to enter in blocking position with said stops, a pair of ears projecting from said bushings, a collapsible leg member pivoted to each of said pair of ears, said leg members further including means for additionally linking said leg members to the hereinbefore defined structure.

8. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, each collapsible leg member consisting of an upper half leg member and a lower half leg member pivotally linked to said upper half leg member, said upper half leg member having a slot connection, each branch supporting one of said bushings further having a knob, said slot connection being connectable to said knob to link said upper half leg member to said branch.

9. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, said leg members further including means for additionally linking said leg members to the hereinbefore defined structure, a pair of spaced apart cross bars, each cross bar having two pairs of spaced apart fingers, rubber pads pivotally mounted on said fingers, a stationary clamp member and a rotatable and blockable clamp member mounted on each cross bar in spaced apart relationship, one of said side members of said pair of side members being adapted to be clamped by said stationary clamp members and the other of said side members being adapted to be clamped by said rotatable and blockable clamp members, and means for anchoring said cross bars onto a roof of a motor car.

10. The collapsible luggage rack as claimed in claim 9, wherein said means for anchoring said cross bars onto said motor car consist in a pair of strip members each adjustably and removably mounted in spaced apart relationship on said cross bar, each strip member having a free end portion, a bracket integral with each of said strip members, a wing nut arrangement supported by each of said brackets, a height adjustable anchoring L-shaped member controlled by each of said wing nut arrangements, each of said height adjustable L-shaped members being at least partially located below said free end of its strip member.

11. A collapsible luggage rack for motor cars and the like, transformable into a table as well as a field bed, comprising a structure including a substantially rectangular main frame member defined by a pair of side members and a pair of cross members, a pair of substantially U-shaped end members pivotally linked to said main frame member at opposite ends adjacent said cross members, each of said U-shaped end members being defined by a pair of branches linked together by a base member, a bushing slidably and rotatably mounted on each of said branches, a collapsible leg member linked to each of said bushings, said leg members further including means for additionally linking said leg members to the hereinbefore defined structure, and a canvas mounted on said cross members.

12. The collapsible luggage rack as claimed in claim 11, wherein cross strips are connected to said canvas, said cross strips having free ends, said free ends being tied to said side members.

References Cited by the Examiner
UNITED STATES PATENTS

| | | |
|---|---|---|
| 2,480,353 | 8/1949 | Bjork. |
| 2,708,276 | 5/1955 | Schloss et al. _____ 5—111 |

FOREIGN PATENTS

| | | |
|---|---|---|
| 305,598 | 7/1955 | Switzerland. |
| 308,725 | 10/1955 | Switzerland. |

GERALD M. FORLENZA, *Primary Examiner.*